US012721350B2

(12) United States Patent
Putnam

(10) Patent No.: US 12,721,350 B2
(45) Date of Patent: Sep. 1, 2026

(54) DRY INSECTICIDE MIXTURES, DISTRIBUTORS, AND METHODS OF DISTRIBUTING A DRY INSECTICIDE

(71) Applicant: Jones-Hamilton Co., Walbridge, OH (US)

(72) Inventor: Michael A. Putnam, Nacogdoches, TX (US)

(73) Assignee: Jones-Hamilton Co., Walbridge, OH (US)

( * ) Notice: Subject to any disclaimer, the term of this patent is extended or adjusted under 35 U.S.C. 154(b) by 308 days.

(21) Appl. No.: 18/592,767

(22) Filed: Mar. 1, 2024

(65) Prior Publication Data

US 2024/0292846 A1 Sep. 5, 2024

Related U.S. Application Data

(60) Provisional application No. 63/449,176, filed on Mar. 1, 2023.

(51) Int. Cl.
*A01P 7/04* (2006.01)
*A01N 25/12* (2006.01)
*A01N 65/03* (2009.01)

(52) U.S. Cl.
CPC ............. *A01N 65/03* (2013.01); *A01N 25/12* (2013.01); *A01P 7/04* (2021.08)

(58) Field of Classification Search
CPC ........................................................ A01P 7/04
See application file for complete search history.

(56) References Cited

U.S. PATENT DOCUMENTS

| | | | |
|---|---|---|---|
| 5,707,658 | A | 1/1998 | Morgan et al. |
| 5,958,491 | A | 9/1999 | Knueven |
| 6,132,792 | A | 10/2000 | Knueven et al. |
| 7,048,803 | B2 | 5/2006 | Williams |
| 8,662,019 | B2 | 3/2014 | Eutsler et al. |
| 9,095,115 | B1 | 8/2015 | Knueven et al. |
| 9,155,282 | B2 | 10/2015 | Eutsler et al. |
| 2006/0225473 | A1 | 10/2006 | Johnson et al. |
| 2010/0003363 | A1 | 1/2010 | Knueven et al. |
| 2015/0010653 | A1 | 1/2015 | Knueven et al. |
| 2015/0150264 | A1 | 6/2015 | Knueven et al. |
| 2017/0143861 | A1 | 5/2017 | Jensen et al. |
| 2019/0352585 | A1 | 11/2019 | Hrebenar et al. |

FOREIGN PATENT DOCUMENTS

CN 102145297 A * 8/2011

* cited by examiner

*Primary Examiner* — Qiuwen Mi
(74) *Attorney, Agent, or Firm* — MacMillan, Sobanski & Todd, LLC

(57) ABSTRACT

Example dry insecticide mixtures, distributors that contain a dry insecticide mixture, and methods of distributing a dry insecticide in a structure, such as an animal confining structure, are described. Dry insecticide mixtures include sodium bisulfate and a dry insecticide. An example dry insecticide mixture includes a first layer comprising sodium bisulfate and diatomaceous earth and a second layer consisting essentially of diatomaceous earth. The weight ratio of diatomaceous earth to sodium bisulfate in the dry insecticide mixture is between about 1:10 and about 1:2.

9 Claims, 3 Drawing Sheets

DRY INSECTICIDE MIXTURES, DISTRIBUTORS, AND METHODS OF DISTRIBUTING A DRY INSECTICIDE

CROSS REFERENCE TO RELATED APPLICATION

This application claims priority to U.S. Provisional Application No. 63/449,176, filed on Mar. 1, 2023. The entire contents of this related application are hereby incorporated by reference into this disclosure.

FIELD

The disclosure relates generally to the field of insecticides. More particularly, the disclosure relates to dry insecticide mixtures useful in the control of undesirable insects in a variety of environments, including commercial animal agriculture. The disclosure also relates to distributors that contain a dry insecticide mixture, and methods of distributing a dry insecticide in a structure, such as an animal containment structure.

BACKGROUND

Insecticides and other agents are frequently used in commercial animal agriculture. Dry, or granular, insecticides are applied to control undesirable insects in animal confining environments, such as poultry facilities. Sodium bisulfate (SBS) is an active ingredient in some granular poultry litter treatments that are applied in efforts to abate ammonia. For multiple reasons, SBS has only been applied to animal confining environments independently of dry insecticides. Indeed, prior to this invention, there has been no practice of the mechanical application of insecticides in conjunction to, or in combination with, SBS.

A need exists for new and improved dry insecticide mixtures, distributors that contain a dry insecticide mixture, and methods of distributing a dry insecticide in a structure, such as an animal confining structure.

BRIEF SUMMARY OF SELECTED EXAMPLES

Various example dry insecticide mixtures are described herein.

An example dry insecticide mixture comprises SBS and a dry insecticide.

Another example dry insecticide mixture comprises a dry insecticide and SBS, the dry insecticide having a first weight percentage of the dry insecticide mixture and the SBS having a second weight percentage of the dry insecticide mixture, the first weight percentage being less than the second weight percentage.

Another example dry insecticide mixture comprises diatomaceous earth (DE) and SBS.

Another example dry insecticide mixture comprises DE and SBS, the dry insecticide having a first weight percentage of the dry insecticide mixture and the SBS having a second weight percentage of the dry insecticide mixture, the first weight percentage being less than the second weight percentage.

Another example dry insecticide mixture comprises DE and SBS having weight ratios of between about 1:10 and about 1:1.

Various example distributors that contain a dry insecticide mixture are also described.

An example distributor comprises one or more walls that define a hopper, a first opening at a first end of the hopper, sized and configured for loading a dry insecticide mixture according to an embodiment into the hopper, a second opening at a second end of the hopper, sized and configured to allow the dry insecticide mixture contained within the hopper to exit the hopper, and a spreader disposed adjacent the second opening and adapted to receive the dry insecticide mixture exiting the hopper through the second opening and propel the dry insecticide mixture to an area adjacent the distributor. The one or more walls are sloped generally downward, toward the second opening, to facilitate gravity-based exit of the dry insecticide mixture from the hopper through the second opening and onto the spreader. An optional chute can be included for directing dry insecticide mixture from the second opening onto the spreader. If included, the chute can be secured to the wall or otherwise disposed adjacent the second opening. A dry insecticide mixture according to an embodiment is disposed within the hopper of the distributor.

Various example methods of distributing a dry insecticide in a structure are described.

An example method of distributing a dry insecticide within a structure comprises distributing a dry insecticide in the structure and distributing SBS in the structure.

Another example method of distributing a dry insecticide within a structure comprises distributing a dry insecticide mixture comprising a dry insecticide and SBS in the structure. In these methods, the distributing the dry insecticide and the distributing the SBS in the structure are performed simultaneously.

Another example method of distributing a dry insecticide within a structure comprises distributing a dry insecticide in the structure and simultaneously distributing SBS in the structure. In these methods, the distributing the dry insecticide and the distributing the SBS in the structure are performed simultaneously using separate distribution equipment.

Another example method of distributing a dry insecticide within a structure comprises distributing one of a dry insecticide and SBS in the structure, and, after the distributing one of a dry insecticide and SBS in the structure is completed, distributing the other of a dry insecticide and SBS in the structure. In these methods, the distributing one of a dry insecticide and SBS in the structure and distributing the other of a dry insecticide and SBS in a structure can be performed using a distributor containing at least one layer of a dry insecticide and at least one layer of SBS.

Additional understanding of these example dry insecticide mixtures and methods of distributing a dry insecticide within a structure can be obtained by review of the detailed description of selected examples, below, and the references drawings.

DETAILED DESCRIPTION OF SELECTED EXAMPLES

Figure 1:
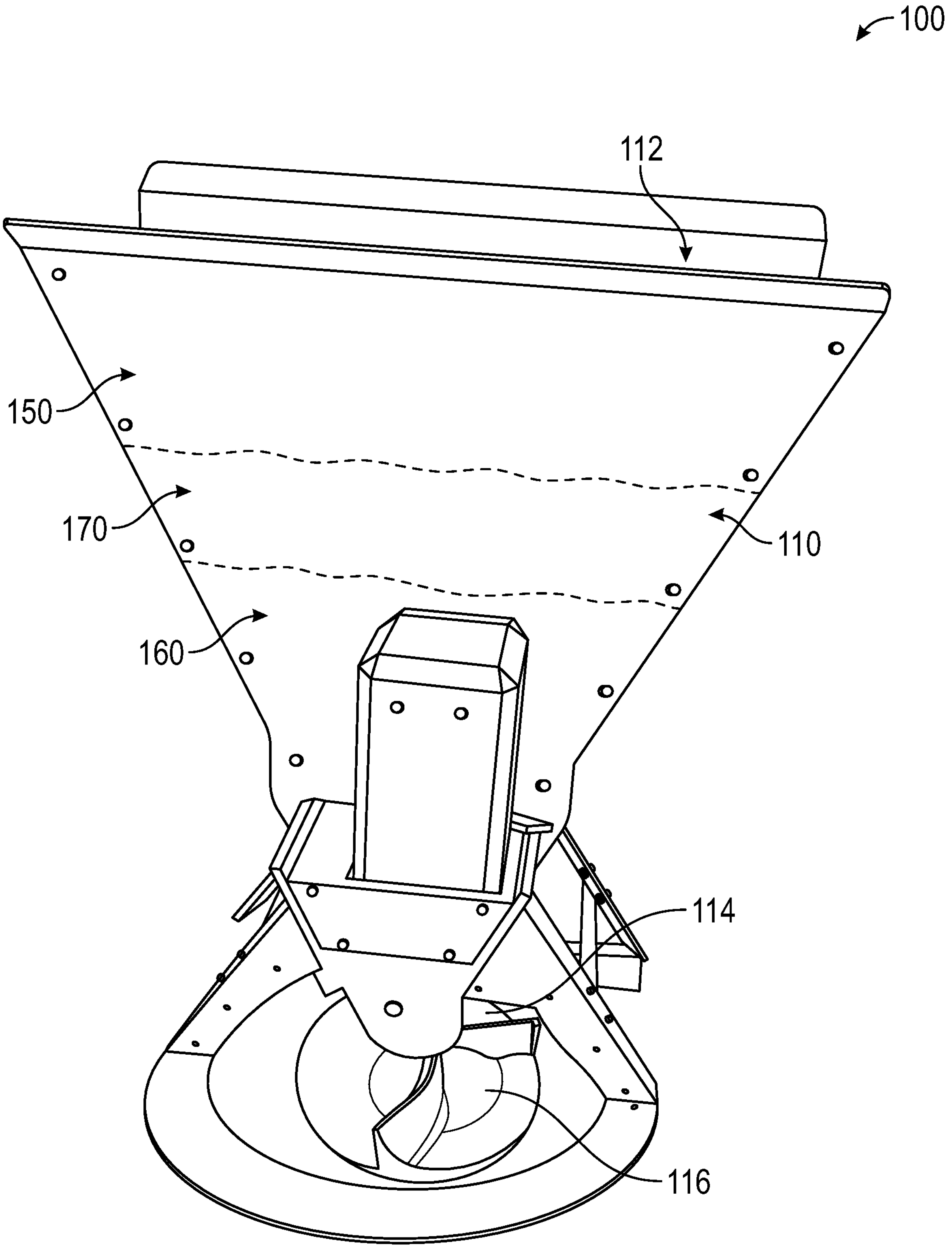
FIG. 1 is a perspective view of an example distributor containing an example dry insecticide mixture.

The following detailed description and the appended drawings describe and illustrate various example dry insecticide mixtures and methods of distributing a dry insecticide within a structure. The description and illustration of these examples are provided to enable one skilled in the art to make and use example dry insecticide mixtures, and to practice example methods of distributing a dry insecticide within a structure. The inclusion of detailed descriptions of these examples is not intended to limit the scope of the invention, or its protection, in any manner. The invention is capable of being practiced or carried out in various ways and the examples described and illustrated herein are not considered exhaustive.

As used herein, the term "mixture" refers to a composition including two or more materials. The materials can be distributed within the composition in any suitable manner, including within fully separate layers, homogenously distributed throughout the composition, and any distribution of the materials between these two distributions.

SBS is currently applied separately from insecticides as a customary practice. However, the inventors have determined that these two agents can be applied accurately when properly combined and with the appropriate application equipment. The inventors have surprisingly found that the distribution of an insecticide, such as diatomaceous earth (DE), throughout a structure, such as an animal confining structure, is significantly improved when the insecticide is formulated in a mixture with SBS. Also surprisingly, the inventors have found that the inclusion of SBS as a diluent provides a more efficacious agent for killing Darkling Beetles. The inventors believe that SBS, in this application, acts as an adjuvant for the DE.

A dry insecticide mixture according to an embodiment includes a dry insecticide and SBS in a dry mixture.

Any suitable dry insecticide can be included in the dry insecticide mixtures according to the invention. Examples of suitable dry insecticides for inclusion in a dry insecticide mixture according to the invention include, but are not limited to, dry insecticides from the following classes of the Insect Resistance Action Committee Standard: 1, 2, 3, 4, 5, 7, 8, and 17. Specific examples of dry insecticides considered suitable for inclusion in the dry insecticide mixtures according to the invention include, but are not limited to, including, but not limited to, Acetylcholinesterase (ACH) inhibitors (Class 1); Group A, Group B (Class 2); Sodium channel modulators, Group A (Class 3); Nicotinic acetylcholine receptor (nAChR) competitive modulators, Group A, Group B (Class 4); Nicotinic acetylcholine receptor (nAChR) allosteric modulators—Site1 Spinosyns (Class 5); Juvenile hormone mimics. Group A, B, C (Class 7); and Group A, B, C, D, E, F (Class 8).

Mechanical insecticides are considered particularly advantageous for inclusion in dry insecticide mixtures according to embodiments of the invention at least because the inventors have determined that SBS provides surprising dilutive effects with these dry insecticides. Diatomaceous Earth (DE) is considered particularly advantageous for inclusion as a mechanical insecticide in a dry insecticide mixture according to an embodiment at least because it is readily available, is recognized as safe for use in organic agriculture, and has a broad range of insecticidal activity. DE shows favorable insecticidal activity on beetles, including Spotted Cucumber Beetle (southern corn rootworm), Asparagus Beetle, Bean Beetles, Blister Beetles, Carpet Beetle, Cigarette Beetle, Colorado Potato Beetle, Confused Flour Beetle, Dried fruit Beetle, Drugstore Beetle, Elm Leaf Beetle, Flea Beetles, Hide Beetle, Japanese Beetle, Mexican Bean Beetle, Red Flour Beetle, Sawtoothed Grain Beetle, American Spider Beetle, Yellow Mealworm, and other beetles; moths, including Angoumois Grain Moth, Artichoke Plume Moth, Codling Moth, Diamondback Moth (adults & larvae), Ponderosa Pine Tip Moth, Grapeleaf Skeletonizer, Gypsy Moth (adults & larvae), Indian Meal Moth, Mediterranean Flour Moth, Tobacco Moth, Pine Tussock Moth, and other moths; weevils, including Boll Weevil, Carrot Weevil, Sweetclover Weevil, Pepper Weevil, Rice Weevil, and other weevils; flies, gnats, and maggots, including Apple Maggot, Blow Flies, Cabbage Maggots, Cherry Fruit Fly (cherry maggot), Crane Flies, Fruit Flies, Fungus Gnats, Apple Maggot, Mushroom Fly, Olive Fruit Fly, Onion Maggot, Shore fly, Vinegar Fly, Whiteflies, and other flies, gnats, and magots; worms, slugs and caterpillars, including Armyworm, Bagworm, Beet Armyworm, Cross-striped Cabbageworm, Cankerworms, Caterpillars, Corn Earworm (bollworm/tomato fruitworm), Dark Mealworm, Eastern Tent Caterpillar, Fireworms, Forest Tent Caterpillar, Cherry Fruitworm, Tobacco Hornworm, Green Fruitworm, Imported Cabbageworm, Lesser Mealworm, Navel Orangeworm, Pink bollworm, Potato Tuberworm, Saltmarsh caterpillar, Spotted Garden Slug, Tobacco Budworm, Tomato Fruitworm (bollworm/corn earworm), Tomato Hornworm, Tomato pinworm, Beet Webworm, Corn Root Webworm, Western Yellowstriped Armyworm, and other worms, slugs, and caterpillars; bugs, scales and plant Mites, including Armored Scale, Bedbugs, Billbugs, Boxelder Bug, Clover Mite, Eriophyid Mite, Grain Mite, Grape Mealybug, Greenbug, Harlequin Bug, Lacebugs, Leaffooted bug, Citrus Mealybug, Proba bug, Tarnished Plant Bug, Tomato bug, Tomato Russet Mite, Soft Scale, Squash bug, Stink Bugs, Southern chinch bug, Sowbugs, Grape mealybug, and other bugs, scales, and plant Mites; and Aphids, Borers, Leafhoppers, Leaf miners, loopers and other insects, such as Ants (excluding Fire, Harvester, Carpenter and Pharaoh ants), Aphids, Bermudagrass Mirids, Twig Borers, Cabbage Looper, Cadelle, Chalcids, Cheese Skipper, Crickets, Mole Crickets, Earwigs, European Corn Borer, Fruittree Leafroller, Garden Symphylan, Glassy-winged Sharpshooter, Grape Leafhoppers, Grasshoppers, Green Peach Aphid, Greenhouse Thrip, Katydids, Leafhoppers, Leafminers, Leafrollers, Leaftiers, Loopers, Millipedes, Orange *Tortrix*, Pacific Flatheaded Borer, Pear Psylla, Potato Leafhopper, Psyllids, Shothole borer, Silverfish, Skippers, Springtails, Thrips, and other aphids, borers, leafhoppers, leaf miners, loopers, and insects.

SBS is advantageous for inclusion, along a dry insecticide, in the dry insecticide mixtures according to embodiments of the invention at least because of the surprising improvement it provides for distribution of a dry insecticide, discovered by the inventors, and because it is a mineral acid suitable as an inert ingredient.

Dry insecticide mixtures according to embodiments of the invention can include a dry insecticide and SBS at any suitable relative ratio. A skilled artisan will be able to select a suitable ratio of dry insecticide to SBS for a dry insecticide mixture according to a particular embodiment based on various considerations, including, but not limited to, the type and nature of the dry insecticide, any desired coverage for the dry insecticide mixture, any desired final concentration of the dry insecticide per unit coverage area, and other considerations. Examples of suitable weight ratios of dry insecticide to SBS in a dry insecticide mixture according to an embodiment of the invention include, but are not limited to, 1:1000 (dry insecticide to SBS), 1:100, 1:90, 1:80, 1:70, 1:60, 1:50, 1:40, 1:30, 1:20, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 20:1, 30:1, 40:1, 50:1, 60:1, 70:1, 80:1, 90:1, 100:1, and 1000:1.

To achieve the surprising improvement in distribution discovered by the inventors, the inventors consider it particularly advantageous to include a dry insecticide in a dry insecticide mixture according to an embodiment at a weight percentage that is less than the weight percentage of SBS in the dry insecticide mixture. The inventors consider it particularly advantageous to include a dry insecticide in a dry insecticide mixture according to an embodiment at a weight percentage that is equal to about half the weight percentage of SBS in the dry insecticide mixture. The inventors consider it particularly advantageous to include a dry insecticide in a dry insecticide mixture according to an embodiment at a weight percentage that is less than half the weight percentage of SBS in the dry insecticide mixture. The inventors consider it particularly advantageous to include a dry insecticide in a dry insecticide mixture according to an embodiment at a weight percentage that is equal to about one tenth the weight percentage of SBS in the dry insecticide mixture. The inventors consider it particularly advantageous to include a dry insecticide in a dry insecticide mixture according to an embodiment at a weight percentage that is less than one tenth the weight percentage of SBS in the dry insecticide mixture.

The inventors have determined that a dry insecticide mixture that includes SBS and DE as the dry insecticide is particularly advantageous at least because it provides desirable distribution properties and desirable insecticidal properties. For dry insecticide mixtures according to embodiments of the invention, the inventors consider weight ratios of DE to SBS in the dry insecticide mixture of between about 1:10 and about 1:1 to be particularly advantageous. The inventors consider weight ratios of DE to SBS in the dry insecticide mixture of between about 1:10 and about 1:2 to be particularly advantageous. In one specific example, the inventors consider a dry insecticide mixture that includes about 6 pounds of DE and about 50 pounds of SBS, or multiples of these values, provides desirable distribution and insecticidal properties. In another specific example, the inventors consider a dry insecticide mixture that includes about 75 pounds of DE and about 200 pounds of SBS, or multiples of these values, provides desirable distribution and insecticidal properties.

Dry insecticide mixtures according to embodiments can be disposed in any container considered suitable for storage, transportation, and distribution. Structurally, a container need only define a chamber for containing the dry insecticide mixture and at least one opening for disposing the dry insecticide mixture into the chamber and for removing the dry insecticide mixture from the chamber. Multiple openings can be included for one or both of these purposes.

Example distributors that contain a dry insecticide mixture according to an embodiment are provided. Distributors according to embodiments can take a variety of forms, shapes, configurations, sizes, and capacities. Some distributors are hand-held and have relatively small capacity for holding dry insecticide mixture. Other distributors are disposed on a vehicle frame or trailer frame and have a relatively large capacity for holding dry insecticide mixture. Generally, distributors according to embodiments include one or more walls that define a hopper, a first opening at a first end of the hopper, sized and configured for loading a dry insecticide mixture according to an embodiment into the hopper, a second opening at a second end of the hopper, sized and configured to allow the dry insecticide mixture contained within the hopper to exit the hopper, and a spreader disposed adjacent the second opening and adapted to receive the dry insecticide mixture exiting the hopper through the second opening and propel the dry insecticide mixture to an area adjacent the distributor. The one or more walls can be sloped generally downward, toward the second opening, to facilitate gravity-based exit of the dry insecticide mixture from the hopper through the second opening and onto the spreader. An optional chute can be included for directing dry insecticide mixture from the second opening onto the spreader. If included, the chute can be secured to the wall or otherwise disposed adjacent the second opening. In all distributor embodiments, a dry insecticide mixture according to an embodiment is disposed within the hopper of the distributor.

FIG. 1 illustrates an example distributor 100. The distributor includes opposing first and second walls 110 that define hopper 112 and an opening at an upper end of the hopper 112 that is sized and configured for loading a dry insecticide mixture 150 according to an embodiment into the hopper 112. A second opening 114 is defined at a lower end of the hopper 112 and is sized and configured to allow the dry insecticide mixture 150 contained within the hopper 112 to exit the hopper 112. The walls 110 slope generally downward, toward the second opening 114, to facilitate gravity-based exit of the dry insecticide mixture 150 from the hopper 112 through the second opening 114 and onto the spreader 116. The spreader 116 is a rotating disc having curved walls that define circumferential segments for receiving dry insecticide mixture 150 exiting the second opening 114. As the disc rotates, by application of a power source or by manual operation, the spreader 116 propels dry insecticide mixture 150 to an area adjacent the distributor 100.

In this embodiment, dry insecticide mixture 150 has first 160 and second layers 170. The first layer 160 is one of SBS and a dry insecticide, such as DE. The second layer 170 is the other of SBS and the dry insecticide. Advantageously, the first layer 160, which is disposed nearer to the second opening 114 and the spreader 116 than the second layer 170, is SBS and the second layer, which is disposed further from the second opening 114 and the spreader than the first layer, is the dry insecticide, such as DE. This structural configuration of the first 160 and second 170 layers within the hopper 112 is considered particularly advantageous at least because it facilitates beneficial mixing of the SBS and dry insecticide during operation of the distributor 100. An opposite arrangement of the layers 160, 170 can be used, however. Specifically, the first layer 160 can be the dry insecticide, such as DE, and the second layer 170 can be SBS.

Figure 2:
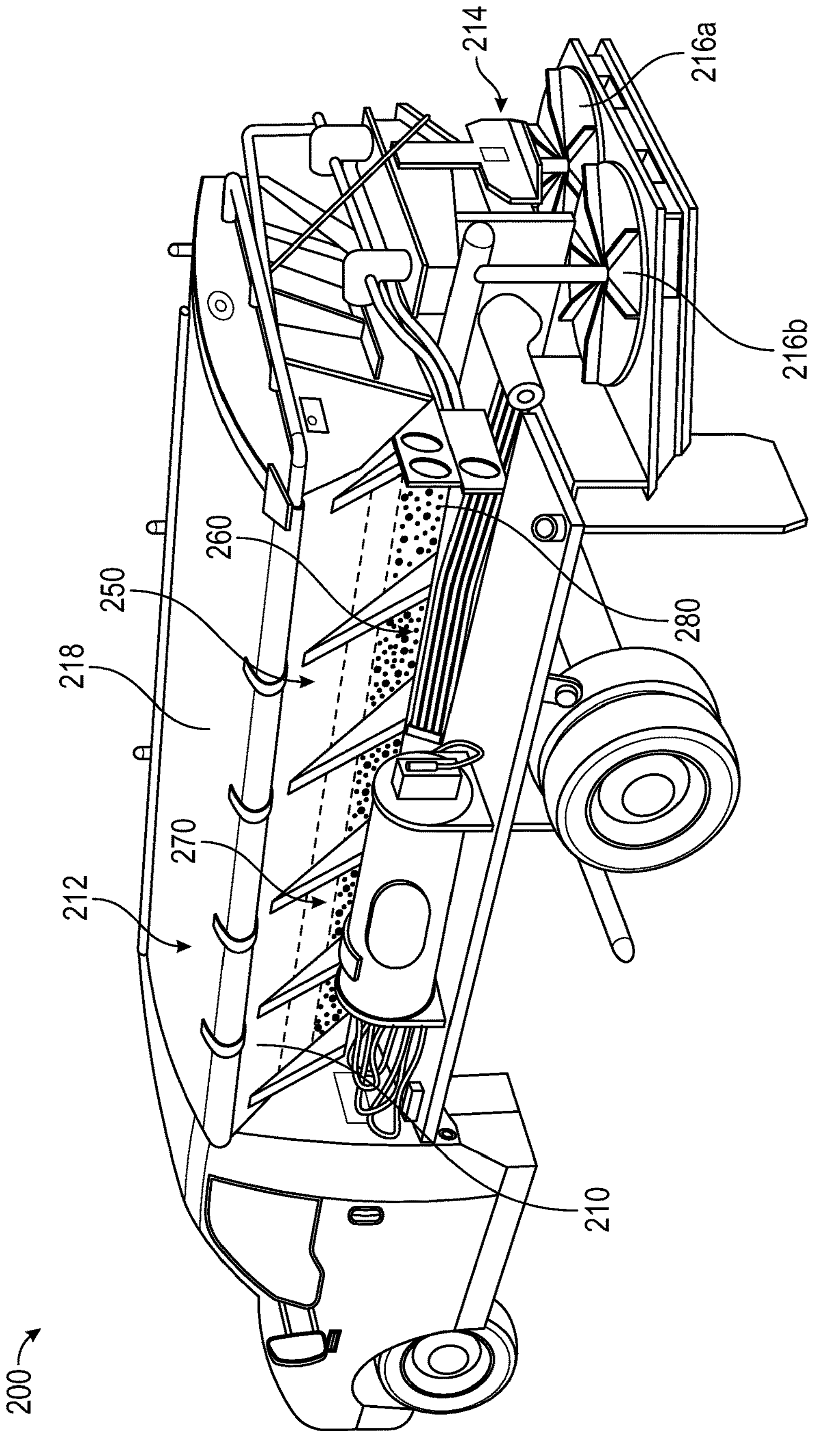
FIG. 2 is a perspective view of another example distributor containing another example dry insecticide mixture.

FIG. 2 illustrates another example distributor 200. The distributor 200 is mounted on the frame of a vehicle, which is a truck in this example The distributor 200 includes opposing first and second walls 210 that define hopper 212 and an opening at an upper end of the hopper 212 that is sized and configured for loading a dry insecticide mixture 250 according to an embodiment into the hopper 212. A second opening 214 is defined at a lower end of the hopper 212 and is sized and configured to allow the dry insecticide mixture 250 contained within the hopper 212 to exit the hopper 212. The walls 210 slope generally inward and a chute disposed beneath the hopper 212 slopes toward first **216*a* and second 216*b* spreaders. Each of the spreaders 216*a*, 216*b* is a rotating disc having walls that define circumferential segments for receiving dry insecticide mixture 250 exiting the chute. Rotation of the spreaders 216*a*, 216*b* propels dry insecticide mixture 250 to an area adjacent the distributor 200**.

In this embodiment, dry insecticide mixture 250 has first 260 and second layers 270. The first layer 260 includes both SBS and a dry insecticide, such as DE. The second layer 270 consists of, or consists essentially of, one of SBS and the dry insecticide. Advantageously, the first layer 260, which is disposed nearer to the second opening 214 and the spreaders 216*a*, 216*b* than the second layer 270, includes SBS and the dry insecticide and the second layer 270, which is disposed further from the second opening 114 and the spreaders 216*a*, 216*b* than the first layer 260, consists of, or consists essentially of, the dry insecticide, such as DE. This structural configuration of the first 260 and second 270 layers within the hopper 212 is considered particularly advantageous at least because it facilitates beneficial mixing of the SBS and dry insecticide during operation of the distributor 200 and ensures that dry insecticide is included in initial distributor of the dry insecticide mixture at the initiation of operation of the distributor 200. An opposite arrangement of the layers 260, 270 can be used, however. Specifically, the first layer 260 can consist of, or consists essentially of, the dry insecticide, such as DE, and the second layer 270 can comprise both SBS and the dry insecticide.

Figure 3:
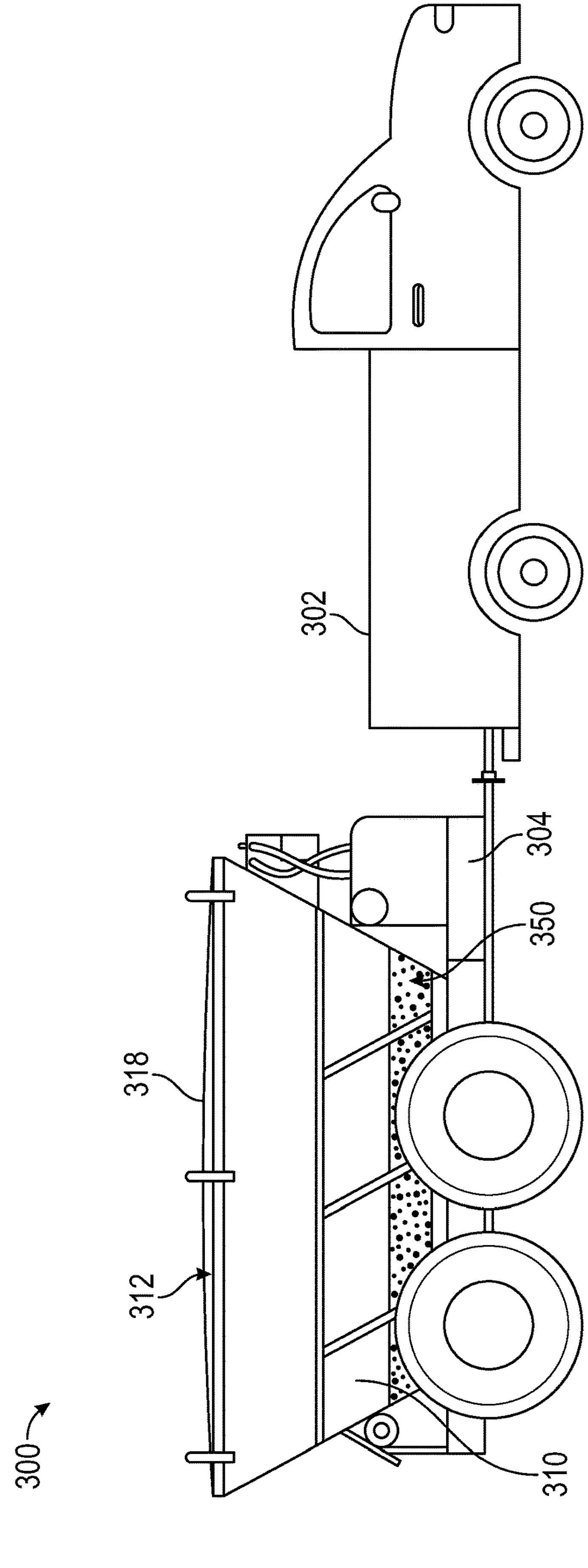
FIG. 3 is a perspective view of another example distributor containing another example dry insecticide mixture.

FIG. 3 illustrates another example distributor 300. The distributor 300 is mounted on the frame of a trailer, which is towed behind a truck in this example. The distributor 300 includes opposing first and second walls 310 that define hopper 312 and an opening at an upper end of the hopper 312 that is sized and configured for loading a dry insecticide mixture 350 according to an embodiment into the hopper 312. A second opening (not visible in the figure) is defined at a lower end of the hopper 312 and is sized and configured to allow the dry insecticide mixture 350 contained within the hopper 312 to exit the hopper 312. The walls 310 slope generally inward and downward toward a spreader (not visible in the figure). Rotation of the spreaders propels dry insecticide mixture 350 to an area adjacent the distributor 300.

In this embodiment, dry insecticide mixture 350 is a homogenous mixture of SBS and a dry insecticide, such as DE. The dry insecticide mixture 350 does not include any layers, and each of the SBS and DE is evenly distributed throughout the dry insecticide mixture 350 and within the hopper 312.

Methods of distributing a dry insecticide in a structure are also provided. The methods include distributing a dry insecticide in the structure and distributing SBS in the structure.

In methods according to some embodiments, the dry insecticide and SBS are components in a dry insecticide mixture. In these methods, the distributing a dry insecticide in the structure and distributing SBS in the structure are accomplished by distributing the dry insecticide mixture in the structure. Thus, in these methods, the distributing the dry insecticide and the distributing the SBS in the structure are performed simultaneously.

An example method of distributing a dry insecticide in a structure comprises preparing a dry insecticide mixture comprising a dry insecticide and SBS, and distributing the dry insecticide mixture in the structure. The dry insecticide mixture can be a dry insecticide mixture according to an embodiment of the invention, including the example dry insecticide mixtures described herein. In one example method, the distributing the dry insecticide mixture is performed using a handheld, power duster, powder spreader, or other equipment suitable for distributing a dry mixture in the structure. In one particularly preferred example, the distributing the dry insecticide mixture is performed to distribute the dry insecticide, such as DE, at 6 lbs. per 1000 square feet and to distribute SBS at 75-200 lbs. per 1000 square feet. The coverage area can include various surfaces in the structure, including litter areas and underneath feed and watering equipment lines. In these methods, the preparing step is advantageously performed to prepare a dry insecticide mixture suitable for achieving these distribution rates of the dry insecticide and SBS, such as by adding a suitable ratio of products into a commercial mixing apparatus and packaging the ensuing combination/mix under one label. This negates the need for the applicator to "layer" the products during the loading of the spreading apparatus.

In methods according to some embodiments, the dry insecticide and SBS are separate components that are distributed simultaneously. In these methods, the distributing the dry insecticide in the structure and the distributing the SBS in the structure are performed simultaneously using separate distribution equipment.

In methods according to some embodiments, the dry insecticide and SBS are separate components that are distributed sequentially. In some of these methods, the distributing the dry insecticide in the structure is performed before the distributing the SBS in the structure is initiated. In some of these methods, the distributing the dry insecticide in the structure is performed after the distributing the SBS in the structure is completed. In some of these methods, the distributing the SBS in the structure is performed before the distributing the dry insecticide in the structure is initiated. In some of these embodiments, the distributing the SBS in the structure is performed after the distributing the dry insecticide is completed. In methods according to these embodiments, the second distributing step is advantageously initiated within twenty-four hours after completion of the first distributing step. In methods according to these embodiments, the second distributing step is advantageously initiated within twelve hours after completion of the first distributing step. In methods according to these embodiments, the second distributing step is advantageously initiated within eight hours after completion of the first distributing step. In methods according to these embodiments, the second distributing step is advantageously initiated within four hours after completion of the first distributing step. In methods according to these embodiments, the second distributing step is advantageously initiated within two hours after completion of the first distributing step. In methods according to these embodiments, the second distributing step is advantageously initiated within one hour after completion of the first distributing step. In methods according to these embodiments, the second distributing step is advantageously initiated within thirty minutes after completion of the first distributing step. In methods according to these embodiments, the second distributing step is advantageously initiated within fifteen minutes after completion of the first distributing step. In methods according to these embodiments, the second distributing step is advantageously initiated immediately after completion of the first distributing step.

In some of these methods, the dry insecticide and the SBS are loaded into a distributor, such as a handheld power duster, powder spreader, or other distribution equipment, to create layers of the two agents that are distributed sequentially. Continuous operation of the distributor ensures that distribution of a second agent begins, i.e., when the distributor begins distributing the second agent, immediately after distribution of the first agent is completed, i.e., when the distributor completes distribution of the first agent.

In all methods of distributing a dry insecticide in a structure, the structure can comprise any suitable structure. The structure advantageously comprises a structure within which insecticidal activity is desired. Furthermore, while not necessary, the structure advantageously comprises a structure within which insecticidal activity is desired and within which abatement of ammonia is desired. The inventors consider the methods to be particularly well suited for achieving distribution of a dry insecticide in a structure used in commercial animal agriculture, such as poultry houses.

Example 1—Separate Distribution of DE and SBS

In this example, distributing DE is performed separately from distributing SBS. In one distributing step, a handheld power duster, powder spreader, or other distribution equipment is used to distribute 6 lbs. DE per 1000 square feet in an animal containment structure over animal litter contained within the structure. This rate of distribution can be increased up to 75 lbs. DE per 1000 square feet for severe infestations. If litter is greater than 3 inches deep, up to an additional 2.5 lbs. per 1000 square feet can be distributed per additional inch of litter. In another distributing step, which is either performed to completion before initiation of the distributing step above or initiated after completion of the distributing step above, a handheld power duster, powder spreader, or other distribution equipment is used to distribute between 75-200 lbs. SBS per 1,000 square feet in the animal containment structure over animal litter contained within the structure. Both distributing steps advantageously are performed to distribute the relevant agent to areas underneath any feed and watering equipment lines present in the structure.

Example 2—Sequential Distribution of DE and SBS

In this example, distributing DE and distributing SBS are performed sequentially using layers of these two agents in a distributor. In one distributing step, a distributor, such as a power duster, powder spreader, or other distribution equipment, is used to distribute 6 lbs. DE per 1000 square feet in an animal containment structure over animal litter contained within the structure. This rate of distribution can be increased up to 75 lbs. DE per 1000 square feet for severe infestations. If litter is greater than 3 inches deep, up to an additional 2.5 lbs. per 1000 square feet can be distributed per additional inch of litter. In another distributing step, which is initiated immediately after completion of the distributing step above, the handheld power duster, powder spreader, or other distribution equipment used in the distributing step described above is used to distribute between 75-200 lbs. SBS per 1,000 square feet in the animal containment structure over animal litter contained within the structure. Both distributing steps advantageously are performed to distribute the relevant agent to areas underneath any feed and watering equipment lines present in the structure. This example method is advantageously performed by adding the correct ratio of products into the same distributing apparatus in alternating layers, such as by dumping a 2,000 lb. bulk tote of SBS into the spreader then dumping the desired ratio of bags of DE and then repeating until the spreader was filled to completion. Depending on relative particle size between the DE and the SBS, some mixing of the layers may occur, but is not considered necessary. If sufficient mixing occurs, the method can include simultaneous distribution of DE and SBS, as described above.

Those with ordinary skill in the art will appreciate that various modifications and alternatives for the described and illustrated examples can be developed in light of the overall teachings of the disclosure, and that the various elements and features of one example described and illustrated herein can be combined with various elements and features of another example without departing from the scope of the invention. Accordingly, the particular arrangement of elements and steps disclosed herein have been selected by the inventors simply to describe and illustrate examples of the invention and are not intended to limit the scope of the invention or its protection, which is to be given the full breadth of the appended claims and any and all equivalents thereof.

What is claimed is:

1. A dry insecticide mixture, comprising sodium bisulfate and a dry insecticide;

wherein the dry insecticide has a weight percentage that is less than the weight percentage of sodium bisulfate in the dry insecticide mixture; and wherein the dry insecticide has a weight percentage that is equal to about one tenth the weight percentage of sodium bisulfate in the dry insecticide mixture.

2. A dry insecticide mixture, comprising sodium bisulfate and a dry insecticide;

wherein the dry insecticide has a weight percentage that is less than the weight percentage of sodium bisulfate in the dry insecticide mixture; and wherein the dry insecticide has a weight percentage that is less than one tenth the weight percentage of sodium bisulfate in the dry insecticide mixture.

3. A dry insecticide mixture, comprising sodium bisulfate and a dry insecticide;

wherein the dry insecticide mixture includes first and second layers, the first layer comprising sodium bisulfate and the dry insecticide and the second layer consisting essentially of one of sodium bisulfate and the dry insecticide.

4. The dry insecticide mixture of claim 3, wherein the second layer consists essentially of the dry insecticide.

5. The dry insecticide mixture of claim 4, wherein the dry insecticide comprises a mechanical insecticide.

6. The dry insecticide mixture of claim 5, wherein the mechanical insecticide comprises diatomaceous earth.

7. The dry insecticide mixture of claim 6, wherein the weight ratio of diatomaceous earth to sodium bisulfate in the dry insecticide mixture is between about 1:10 and about 1:1.

8. The dry insecticide mixture of claim 6, wherein the weight ratio of diatomaceous earth to sodium bisulfate in the dry insecticide mixture is between about 1:10 and about 1:2.

9. A dry insecticide mixture, comprising:

a first layer comprising sodium bisulfate and diatomaceous earth; and a second layer consisting essentially of diatomaceous earth;

wherein the weight ratio of diatomaceous earth to sodium bisulfate in the dry insecticide mixture is between about 1:10 and about 1:2.

* * * * *